Oct. 26, 1954     A. C. GOOD ET AL     2,692,660
DRILL SPINDLE WITH FLUID DASH POT
Filed Sept. 22, 1950     3 Sheets-Sheet 1

INVENTORS
ALONZO C. GOOD
ROBERT J. KAEHLER &
CLIFFORD W. DOUGHMAN
BY
THEIR ATTORNEYS

Oct. 26, 1954     A. C. GOOD ET AL     2,692,660
DRILL SPINDLE WITH FLUID DASH POT
Filed Sept. 22, 1950     3 Sheets-Sheet 2

INVENTORS
ALONZO C. GOOD
ROBERT J. KAEHLER &
CLIFFORD W. DOUGHMAN

BY

THEIR ATTORNEYS

Oct. 26, 1954   A. C. GOOD ET AL   2,692,660
DRILL SPINDLE WITH FLUID DASH POT
Filed Sept. 22, 1950   3 Sheets-Sheet 3
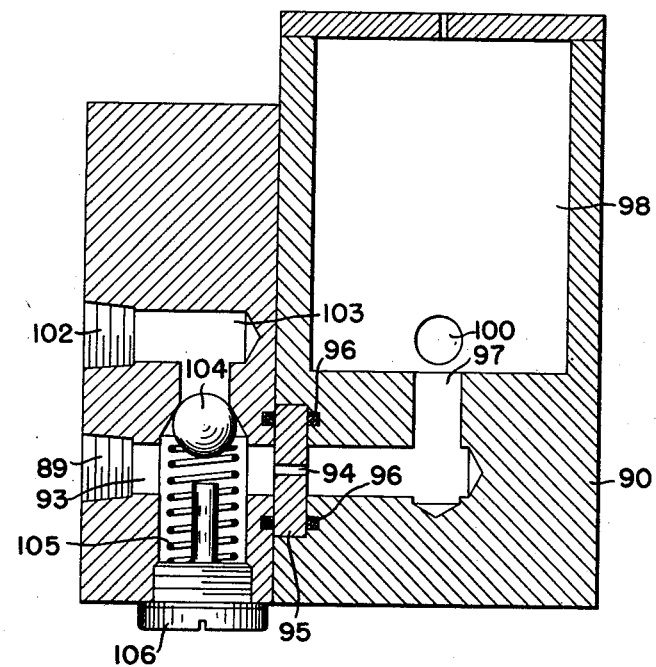
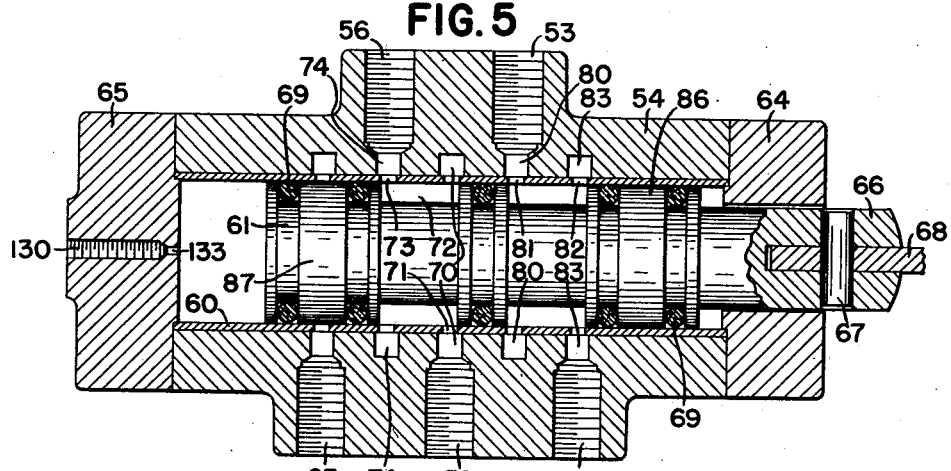
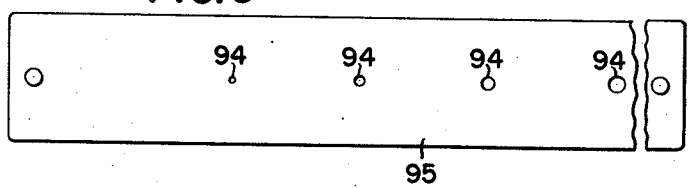
INVENTORS
ALONZO C. GOOD
ROBERT J. KAEHLER &
CLIFFORD W. DOUGHMAN
BY
THEIR ATTORNEYS Patented Oct. 26, 1954

2,692,660

UNITED STATES PATENT OFFICE 2,692,660

DRILL SPINDLE WITH FLUID DASH POT

Alonzo C. Good, Robert J. Kaehler, and Clifford W. Doughman, Dayton, Ohio, assignors to The National Cash Register Company, Dayton, Ohio, a corporation of Maryland Application September 22, 1950, Serial No. 186,262

1 Claim. (Cl. 188—94)

This invention relates to improvements in means for controlling the speed of movement of a machine element.

A specific object of the invention is to provide a fluid valve with a paddle for controlling the speed of movement of a machine element.

Another object of the invention is to provide a fluid valve with a slide having apertures of varying sizes to control the flow of fluid through the valve.

Another object of the invention is to provide a fluid-operated cylinder for moving the drill spindle of a drill press through its working movement.

A still further object of the invention is to so coordinate a fluid-operated cylinder mounted on a drill spindle through the fluid valve as to obtain an accurate constant speed of the lowering of the drill spindle.

With these and incidental objects in view, the invention includes certain novel features of construction and combinations of parts, a preferred form or embodiment of which is hereinafter described with reference to the drawings which accompany and form a part of this specification.

Of said drawings:

Fig. 4 is a sectional view taken through the fluid control valve.

Fig. 5 is a sectional view showing the reversing valve for controlling the direction of movement of the drill spindle.

Fig. 6 is a detail view of the slide having the various sizes of apertures for controlling the rate of flow of fluid through the fluid valve.

General description

Figure 1:
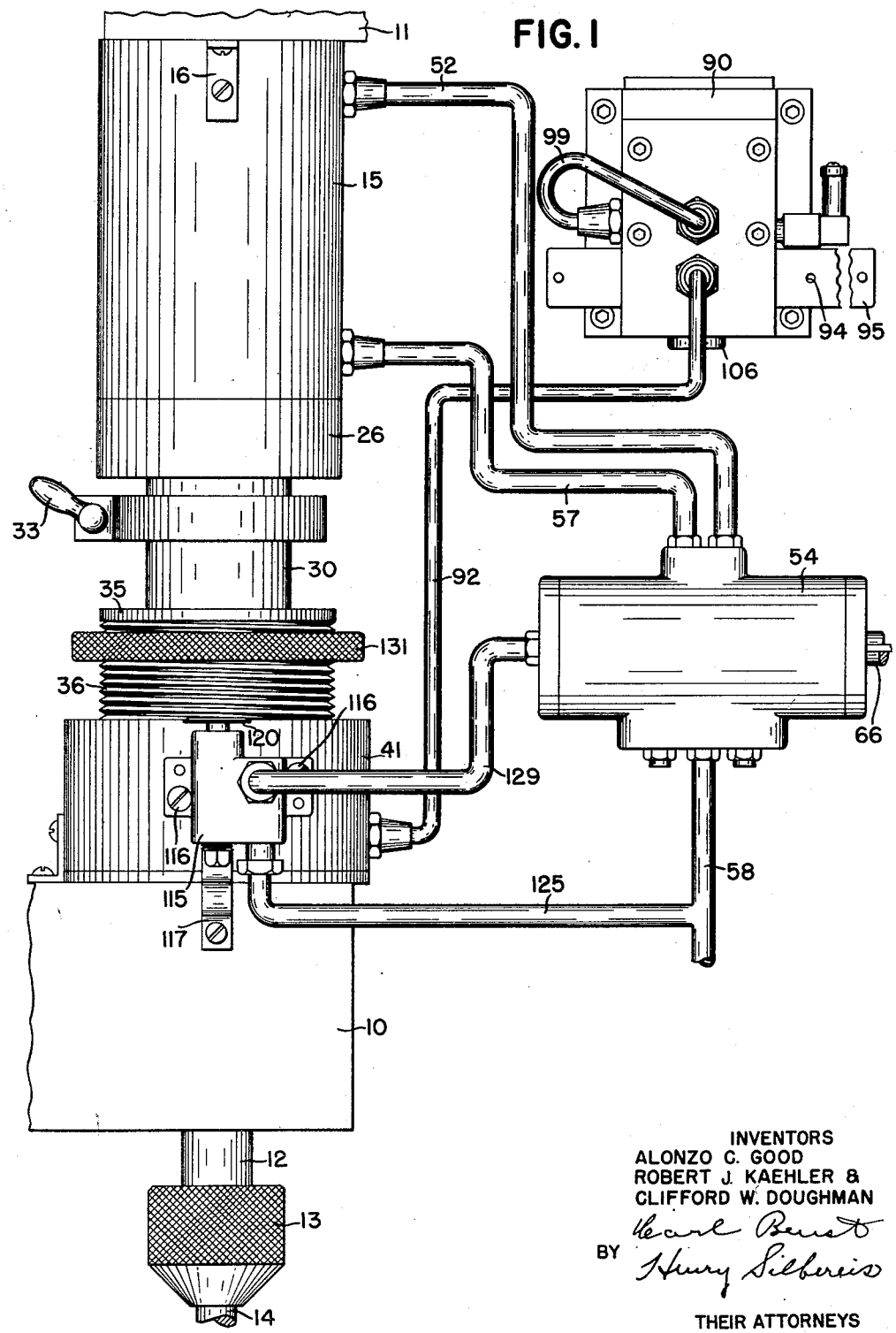
Fig. 1 is a schematic view showing a part of the drill spindle, together with the control valves for controlling the operation of the spindle through its work movement.

The invention broadly consists of a means for accurately controlling the moving part of an automatic machine and for convenience is illustrated herein as applied to the feeding movement of a drill spindle. In the prior art, moving parts have been controlled by a fluid valve in which a needle valve was the controlling element. For extremely accurate work, the speed of travel of the moving part must be controlled with great accuracy to provide good finishes for intricate mechanisms. The feeding speed of the moving part will control the finish of the surface to a great extent. Needle valves, while satisfactory for some production work, are not accurate enough to reproduce certain types of desired finishes consistently. The principal objection to the needle valve controls is that their adjustments are extremely difficult for close work, and it is a time-consuming job to set up for a particular operation, since they must be set by trial, thus resulting in a loss of time in setting up the job in production, and any given setting of the needle valve will vary with the finish of the needle valve itself. Some attempts have been made to index the setting knob of the needle valve, but this proved unsatisfactory, since the machining of the needle valve and the needle valve seat varies with different individually-constructed valves.

To obtain an accurate control, applicants have provided a slide having apertures therein, a selected aperture of which is positioned in the path of the fluid to accurately control the flow of the fluid for any given setting. This slide can be provided with as many apertures of desired size as are required for various types of operations. The smaller the aperture, the slower the speed of the moving part of the machine, and, by positioning a larger aperture in the path of the moving fluid, the speed of the moving part of the machine can be accelerated according to the requirements of the work to be accomplished. Thus, by simply adjusting the slide having a plurality of apertures, to position a desired aperture into the path of the flowing fluid, the speed of feed of the moving part of the machine can be accurately controlled, and the machine will reproduce consistently.

Also, in the prior art, the usual rack-and-pinion construction has been utilized, which is operated by the fluid to lower the drill head. In the present construction, the rack-and-pinion mechanism has been replaced by a fluid-operated piston to control the speed of lowering of the drill head during its drilling operation. This fluid-operated piston construction provides a more accurately controlled movement of the speed of the drill spindle and eliminates objectionable features of the rack-and-pinion mechanisms.

In the operation of an automatic drill, air is introduced into an air cylinder to move the drill spindle quickly from its normal position into its working position, and thereafter the air cylinder actuates a piston in a fluid cylinder, and the flow of the fluid in the fluid cylinder is restricted to reduce the speed of movement of the drill spindle, as controlled by a selected fluid-restricting aperture in a fluid valve.

Detailed description

The invention is disclosed herein as applied to a drill press, which is provided with the usual frame, or standard, having a lower drill spindle support 10 (Fig. 1) and an upper drill spindle support 11. A conventional drill spindle 12 is mounted in the supports 10 and 11 and is rotated in the usual manner by any well-known power means, not shown. The lower end of the drill spindle is provided with a drill chuck 13, in which the drill 14 is held. Mounted on the upper support 11 is a cylindrically-shaped member 15, which is secured to the support by one or more brackets 16. Mounted within the cylinder 15 (Fig. 2) is a second cylindrically-shaped member 17, which is held in relation to the member 15 by one or more pins 18. The inner wall 19 of the cylindrical member 15 and the outer wall 20 of the cylindrical member 17 form a cylinder in which a piston 21 is free to operate. Sealing rings 22 and 23 are provided to seal the space between the two cylinders 15 and 17. The piston 21 is provided with sealing rings 24 and 25 to prevent the passage of air from below the piston 21. The inner wall of the lower end of the piston 21 is threaded to receive the threaded extension of a collar 26.

As hereinafter described, the piston 21 is moved downwardly and upwardly within the walls 19 and 20 by compressed air. In order to maintain a proper alinement between the cylindrical member 15 and the piston 21, a guide bar 27 is secured to the collar 26 by screws 28. The guide bar is movable in a notch 29 cut into the outer periphery of a cylindrical member 15.

The lower end of the collar 26 is threaded to receive a threaded sleeve 30, and the sleeve 30 is locked to the collar 26 by a set screw 31. Adjustably mounted on the sleeve 30 is a tappet collar 32, which may be clamped in any vertical position on the sleeve 30 by means of a clamp 33, of the conventional construction. From the above it will be apparent that, when the piston 21 is lowered, the collar 26, the sleeve 30, and the tappet 32 will be lowered therewith. During the downward movement of the tappet 32, the tappet 32 will come into engagement with a plate 35, secured to a piston 36 by a plurality of screws 37. The piston 36 is normally held in the position shown by a washer 38, supported in a groove formed in the outer wall of the sleeve 30. The lower end of the piston 36 projects into a cylinder 40, formed by the inner walls of a cylindrical member 41 and the inner walls of a cylindrically-formed member 42. Rings 43 and 44 are provided in the piston 36 to seal the surfaces between the piston and the inner walls of the cylinder. A third ring 45 is provided to seal the walls between the cylindrical members 41 and 42. The members 41 and 42 are secured together to form a unit by a plurality of screws 46.

When compressed air is introduced at the top of the piston 21, by the controls hereinafter described, the piston moves rapidly downwardly until the tappet 32 engages the plate 35, whereupon the piston 36 is lowered. The cylinder 40 is provided with oil, the flow of which is controlled so as to control the speed at which the piston 36 can be moved. The method of controlling the flow of the oil is described hereinafter.

The cylindrical member 15 is drilled and tapped at 50 to provide a port to permit the flow of compressed air into an annular port 51 formed on the outer wall of the cylindrical member 17, which port opens into the space above the piston 21 so as to operate the piston 21. An air line 52 (Fig. 1) connects the opening 50 to an opening 53 (Fig. 5) in a starting control valve 54. A drilled and tapped opening 55 (Fig. 2) provides for the passage of compressed air from an annular port 56 and the under side of the piston 21. The opening 55 is connected to an opening 56 (Fig. 5) by an air line 57 (Fig. 1). A compressed air supply line 58 (Fig. 1) is connected to a drilled and tapped opening 59 (Fig. 5) of the control valve 54. The control valve is provided with a sleeve 60, in which a piston 61 operates. The control valve 54 is also provided with two exhaust ports 62 and 63. The control valve 54 is provided with two end plates 64 and 65, and the right-hand end (Fig. 5) of the piston 61 is provided with an extension 66, having a wrist pin 67 mounted thereon, by means of which an operating lever 68 is pivoted thereto. The operating lever 68 may be in the form of a hand-operated lever, a foot treadle, or any other conventional manipulative device. The piston 61 is provided with the usual sealing rings 69, which are well known in the art.

Figure 2:
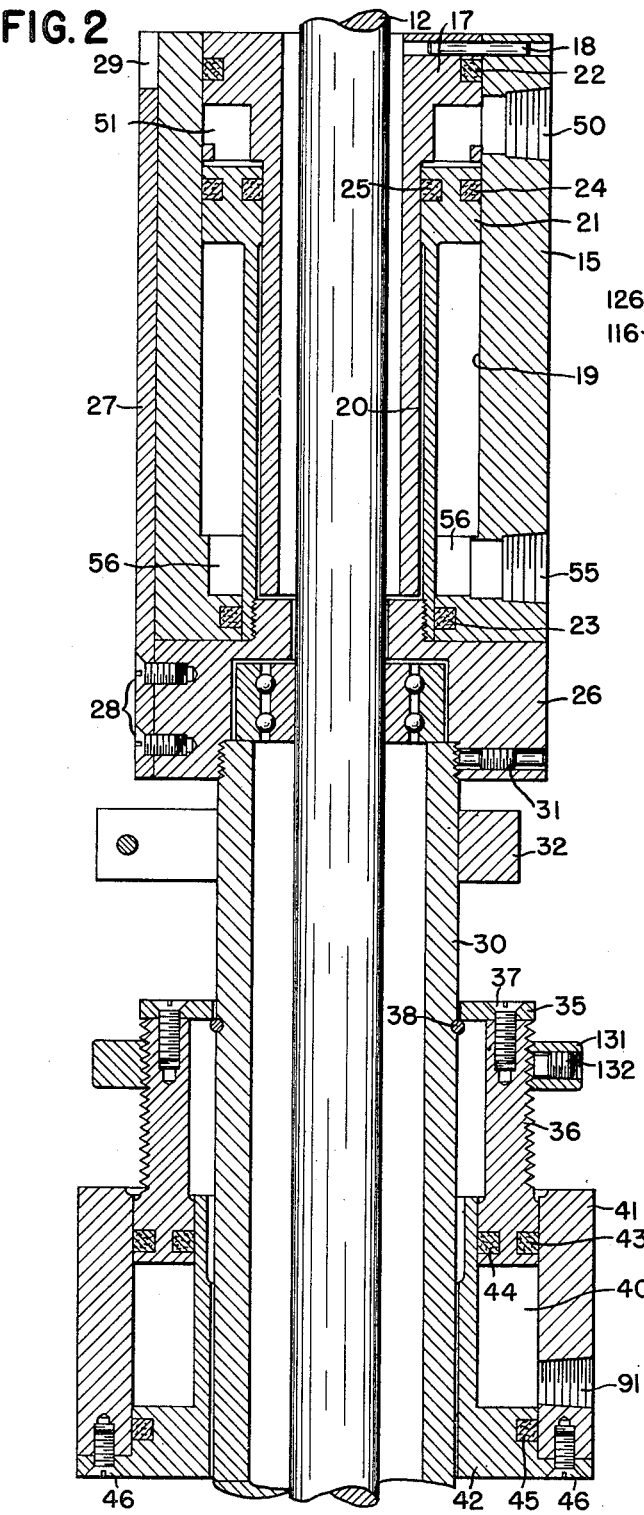
Fig. 2 is a cross-sectional view showing the air and fluid cylinders mounted on the drill spindle.

When the machine is at rest, the parts are as shown in Figs. 2 and 5. At this time, the piston 21 is in its upper position, and the piston 61 is in its right-hand position. At this time, the supply of compressed air passes through the supply line 58, through the opening 59 in the control valve 54, into an annular port 70. The annular port 70 opens into a plurality of holes 71 formed in the sleeve 60, which introduces air into the cylinder around the piston 61 into the space 72. From the space 72, air passes through a plurality of holes 73 formed in the sleeve 60 and thence into an annular port 74 formed in the inner walls of the control valve 54. From the annular port 74, the compressed air is in communication with the air line 57 connected to the opening 55 and the space below the piston 21. Therefore, at this time, the compressed air maintains the piston 21 in its upper position, as shown in Fig. 2.

When the machine is in its normal position, the space above the piston 21 is connected to atmosphere by the air line 52, which is connected to the control valve 54 through the opening 53 (Fig. 5). The opening 53 opens into an annular port 80, which is in communication with a plurality of openings 81 in the sleeve 61. The sleeve 61 is also provided with a plurality of openings 82, in communication with an annular port 83, connected to the exhaust port 62.

When it is desired to start the machine in operation, the lever 68 is operated to shift the piston 61 to the left (Fig. 5) until the exhaust port 62 is closed by the section 86 of the piston 61 and the openings 71 and 81 are brought into communication with each other. At the same time, the section 87 of the piston 61 brings the exhaust port 63 into communication with the openings 73, so that now the space below the piston 21 is connected to atmosphere, and the compressed air moves from the supply line 58 through the opening 59, the annular port 70, the openings 71, through the openings 81 into the annular port 80, and through the opening 56, whereupon the compressed air moves through the air line 52 to force compressed air through the opening 50 and above the piston 21. This starts the piston 21 moving downwardly, carrying the drill spindle 12 therewith and bringing the tappet plate 32 into contact with the plate 35 on the top of the piston 36. When this occurs, the piston 36, being restricted in its movement by the oil in the cylinder 40, in the manner described hereinafter, slows the movement of the piston 21 and the drill spindle 12, connected thereto. The speed of movement of the cylinder 36 is controlled by a fluid valve 90 (Figs. 1 and 4).

The cylinder 40 is connected to the fluid control valve 90 by an oil line 92 (Fig. 1), which is connected to an opening 91 in the member 41 and to an opening 89 (Fig. 4) of the fluid control valve. The oil line 92 provides for the passage of oil from the cylinder 40 into a port 93 of the fluid valve, whereupon the oil passes through a restricted opening 94 of an adjustable paddle, or slide, 95. Oil seals 96 are provided to prevent leakage of oil around the paddle 95. When the piston 36 is lowered, the piston forces the oil through the oil line 92, through the port 93, and then through the restricted opening 94, into a port 97, formed in the control valve. From the port 97, the oil passes into an oil reservoir 98. An oil line 99 (Fig. 1) connects an opening 100 in the reservoir 98 to a drilled and tapped opening 102, connected with a port 103. A ball 104 is seated into a ball seat and held in position by a spring 105, and the spring 105 is held in position by a machine screw 106.

When the piston 36 is lowered, the oil in the piston 41 is forced through the oil line 92 into the port 93, and the flow of oil from the port 93 to the port 97 is restricted by the size of the opening 94, which is positioned in the path of flow of the oil.

From this it is apparent that the size of the opening 94 in the path of the flowing oil will determine the rate of movement of the piston 36, and therefore the rate of movement of such piston, together with the drill spindle, can be accurately controlled by the simple adjustment of the slide 95.

At the time the piston 36 is being lowered and the oil is being forced into the port 93, the ball 104 is forced tightly against its seat, thus preventing the flow of oil from the port 103 into the port 93. However, when the operation of the piston 36 is reversed in the manner to be presently described, the piston, moving upwardly, will release the pressure of the oil on the underneath side of the ball 104, thus permitting the ball to drop under pressure of the oil through the port 103 and permitting free flow of oil from the reservoir through the port 103 past the ball 104, through the port 93 and the oil line 92 into the cylinder 40. Thus, during the reverse movement of the piston 36, the oil by-passes the restricted opening 94 and permits speeded return movement of the piston 36, the sleeve 30, and the drill spindle 12.

Figure 3:
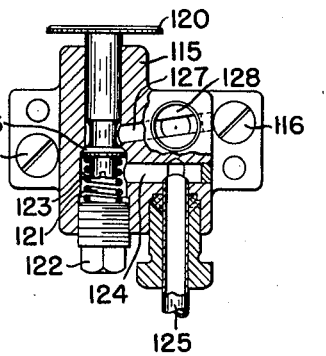
Fig. 3 is a sectional view showing the construction of the reversing valve.

To obtain said reverse movement of the pistons 36 and 21, the piston 61 (Fig. 5) must be shifted back to its right-hand position, as shown in Fig. 5, to admit air into the air line 57 and below the piston 21. The admission of air to so shift the piston 61 is controlled by a trip valve 115 (Figs. 1 and 3). The trip valve 115 is secured to the cylindrical member 41 by screws and brackets 116 and 117, respectively (Fig. 1). The trip valve 115 is provided with a tappet 120, normally held in its upper position by a spring 121. A screw 122 provides a means for adjusting the tension of the spring 121 according to the required needs.

The trip valve 115 is provided with a port 123, connecting to a port 124, to which is connected an air line 125. The air line 125 is connected to the air supply line 58, so that in the normal condition, when the machine is at rest, compressed air is forced into the port 123 to maintain the tappet 120 in its upper position. The lower end of the tappet 120 is provided with a valve seat 126, which normally seals the passage of air from the port 123 into a port 127. When the tappet 120 is lowered, air is permitted to pass around the valve seat 126 and into the port 127. The port 127 connects with the drilled and tapped opening 128, to which one end of an air line 129 is connected, and the other end of the air line 129 is connected to a drilled and tapped opening 130 (Fig. 5) of the starting valve. Adjustably mounted on the piston 36 is a tappet collar 131, which can be adjusted on the piston 36 by the threaded exterior thereof to control the length of movement of the piston 36 during its downward movement. A set screw 132 is provided to lock the tappet plate 131 in its desired position.

As the piston 36 is lowered in the manner described hereinafter, the tappet plate 131 engages the tappet 120 (Fig. 3) to unseat the valve 126, thus permitting the air to flow from the supply line through the air line 125 into the ports 124 and 123 around the valve seat 126, through the port 127, through the air line 129, and into the control valve 54, through the port 130. This shifts the piston 61 of the starting valve into the position shown in Fig. 5, whereupon the ports 70 and 74 are opened to permit air to pass from the supply line through the air line 57 into the position below the piston 21, forcing the piston upwardly. At this time, the piston 61 opens the opening 50 to atmosphere, as hereinbefore described, to permit the piston 21 to rise into the position shown in Fig. 2, whereupon the machine comes to rest.

As hereinbefore mentioned, the tappets 32 and 131 are adjustable. By clamping the tappet plate 32 in any position between the tappet plate 35 and the collar 26, the extent of movement of the drill spindle, under control of the compressed air, can be determined. This movement is a fast-acting movement. When the tappet 32 engages the tappet plate 35, the oil in the cylinder 40 slows down the movement of the drill spindle as controlled by the size of the opening 94 in position to control the flow of the oil when compressed by the piston 36. The position of the tappet plate 131 on the piston 136 controls the extent of movement of the drill spindle after the drill has been moved into its operating position.

Fig. 6 illustrates a paddle 95 having five apertures, any one of which can be brought into registering position with the parts 93 and 97. The fluid valve body is suitably notched to receive the paddle 95, and the paddle is slidably mounted in the notch. The ends of the paddle project out of the fluid valve in the manner illustrated in Fig. 1, to provide access thereto for adjusting the slide in either direction to select a desired aperture 94.

In the above detailed description, the operation of a drill spindle has been described by way of illustration. It is not desired to limit the invention to the operation of a drill spindle, since any moving machine part which requires a quick movement into its operating position and thereafter a slower controlled operating movement can be controlled by the invention described herein.

For example, if a milling machine is to be controlled by the novel fluid valve mechanism, the fast movement can be applied to the approach movement, and the necessary speed for the milling operation can be controlled by the fluid valve, in accordance with the adjustment of the paddle 95, by selecting the proper size opening 94.

While the form of mechanism shown and described herein is admirably adapted to fulfill the objects primarily stated, it is to be understood that it is not intended to confine the invention to the form or embodiment disclosed herein, for it is susceptible of embodiment in various other forms.

What is claimed is:

In a metal working machine of the class described, the combination of a cylindrically-shaped work-head; a tool chuck on one end of the work-head; means located at the other end of the work-head to move the work-head in a working direction and in a retracting direction; an annular fluid cylinder encircling the periphery of the work-head, between the tool chuck and said means, and carried by the frame of the machine; a ring-shaped piston disposed in said annular fluid cylinder and movable in the cylinder, and relatively to the work-head; a tappet on the work-head, normally spaced from the piston, and movable into engagement with the piston during the initial phase of movement of the work-head when moving in working direction, to actuate the piston during the final phase of movement of the work-head in working direction; fluid in the cylinder adjacent one end of the piston; a reservoir for receiving the fluid located at a level above the top of the cylinder; a single conduit connecting the cylinder with the reservoir through which the fluid is forced by the piston when the piston is actuated by the tappet, to force the fluid into the reservoir as the work-head is moved in working direction during the said final phase of movement; a metering device having a plurality of orifices of different sizes, said metering device adjustable to position a selected one of the orifices into the path of flow of the fluid into the reservoir; a second conduit connecting the reservoir with the said single conduit between the cylinder and the metering device; a check valve normally preventing flow of fluid through the second conduit from the reservoir to the said single conduit, said check valve being automatically opened by the fluid when the piston is moved in a retracting direction to cause return flow of the fluid by gravity from the reservoir through the second and single conduits, and into the cylinder; and means on the work-head to engage and retract the piston when the work-head is moved in retracting direction.

References Cited in the file of this patent

UNITED STATES PATENTS

| Number | Name | Date |
|---|---|---|
| 562,410 | Moon | June 23, 1896 |
| 897,676 | Thompson | Sept. 1, 1908 |
| 1,272,933 | Fitts | July 16, 1918 |
| 1,949,711 | Dumser | Mar. 6, 1934 |
| 1,998,873 | Kingsbury | Apr. 23, 1935 |
| 2,282,652 | Henning | May 12, 1942 |